US012647945B2

(12) United States Patent
Ma et al.

(10) Patent No.: US 12,647,945 B2
(45) Date of Patent: Jun. 2, 2026

(54) RESOURCE SELECTION METHOD AND TERMINAL DEVICE

(71) Applicant: DATANG MOBILE COMMUNICATIONS EQUIPMENT CO.,LTD., Beijing (CN)

(72) Inventors: Teng Ma, Beijing (CN); Shupeng Li, Beijing (CN); Xiaotao Ren, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 316 days.

(21) Appl. No.: 18/551,611

(22) PCT Filed: Mar. 24, 2022

(86) PCT No.: PCT/CN2022/082821
§ 371 (c)(1),
(2) Date: Sep. 21, 2023

(87) PCT Pub. No.: WO2022/213812
PCT Pub. Date: Oct. 13, 2022

(65) Prior Publication Data
US 2024/0179686 A1 May 30, 2024

(30) Foreign Application Priority Data

Apr. 6, 2021 (CN) .......................... 202110368223.3

(51) Int. Cl.
H04W 72/02 (2009.01)
H04W 72/04 (2023.01)
(52) U.S. Cl.
CPC ........... H04W 72/02 (2013.01); H04W 72/04 (2013.01)

(58) Field of Classification Search
CPC . H04W 72/04; H04W 72/02; H04W 72/0446; H04W 72/082; H04W 72/541; H04W 92/18
See application file for complete search history.

(56) References Cited

U.S. PATENT DOCUMENTS

2020/0029245 A1    1/2020  Khoryaev et al.
2020/0107297 A1*   4/2020  Wang ................ H04W 72/0446
(Continued)

FOREIGN PATENT DOCUMENTS

CN        107734655 A      2/2018
CN        110139238 A      8/2019
(Continued)

OTHER PUBLICATIONS

Samsung,"Sensing and resource selection for collision avoidance", 3GPP TSG RAN WG1 Meeting #84bis, Busan, Korea, Apr. 11-15, 2016, total 6 pages, R1-162676.
(Continued)

*Primary Examiner* — Rushil P. Sampat
(74) *Attorney, Agent, or Firm* — Kilpatrick Townsend & Stockton LLP

(57) ABSTRACT

Provided are a resource selection method and a terminal device. The method includes: a terminal device obtaining resource occupancy information of other terminal devices according to at least one sensing step length, and selecting target resources from among candidate resources based on the obtained resource occupancy information. The at least one sensing step length is determined according to resource transmission periods supported by a resource pool. The terminal device performs partial sensing according to the sensing step length(s) that is determined according to the resource transmission periods supported by the resource pool, and the number of resource reservation situations that cannot be sensed can be reduced, to improve the effect of (Continued)

partial sensing performed by the terminal device, reducing the probability of a resource collision, and improving the reliability of information transmission of the terminal device.

18 Claims, 4 Drawing Sheets

(56) References Cited

U.S. PATENT DOCUMENTS

| | | | | |
|---|---|---|---|---|
| 2020/0221423 | A1* | 7/2020 | Wang | H04W 72/02 |
| 2020/0260246 | A1* | 8/2020 | Tang | H04W 4/70 |
| 2020/0314803 | A1 | 10/2020 | Zhang et al. | |
| 2022/0350659 | A1* | 11/2022 | Ding | H04W 72/02 |
| 2023/0164814 | A1* | 5/2023 | Miao | H04W 74/0808 |
| | | | | 370/329 |
| 2024/0008001 | A1* | 1/2024 | Zhang | H04W 52/0235 |

FOREIGN PATENT DOCUMENTS

| | | |
|---|---|---|
| CN | 110366256 A | 10/2019 |
| CN | 112261613 A | 1/2021 |
| CN | 112512008 A | 3/2021 |
| WO | 2017176098 A1 | 10/2017 |
| WO | 2019007183 A1 | 1/2019 |
| WO | 2020191769 A1 | 10/2020 |

OTHER PUBLICATIONS

Li Lan et al.,"Study on radio resource pool sharing technology in LTE-eV2X", China Academic Journal Electronic Publishing House, vol. 31, No. 10, Oct. 2018.

Moderator (OPPO), "Fl summary for AI 8.11.1.1-resource allocation for power saving", 3GPP TSG RAN WG1 #104-e, e-Meeting, Jan. 25-Feb. 5, 2021, total 92 pages, R1-2101412.

* cited by examiner

RESOURCE SELECTION METHOD AND TERMINAL DEVICE

CROSS REFERENCE TO RELATED APPLICATION

The present application is a National Stage of International Application No. PCT/CN2022/082821, filed Mar. 24, 2022, which claims the priority to Chinese patent application No. 202110368223.3, filed with the China National Intellectual Property Administration on Apr. 6, 2021 and entitled "Resource Selection Method and Terminal Device", the entire contents of which are incorporated herein by reference.

FIELD

The present disclosure relates to the field of wireless communication technologies, and in particular to a resource selection method and a terminal device.

BACKGROUND

The Vehicle to everything (V2X) is an internet of vehicles (IOV) project approved by the third generation partnership (3GPP) radio access network (RAN) #72, and is mainly for researching an IOV message transmission scheme based on the long term evolution (LTE). In the LTE V2X technology, each terminal device transmits information based on resources in resource pools. In order to avoid resource collision, the terminal device can continuously monitor the channels, obtain resource occupancy information of other terminal devices, and select, according to the resource occupancy information of other terminal devices, resources that have not been occupied currently to transmit packets.

Pedestrian-user equipment (P-UE) is supported in the LTE V2X technology. Considering the power consumption problem caused by continuously monitoring the channels by the P-UE, the P-UE can monitor the channels via partial sensing, that is, the P-UE can monitor the channels only at certain non-consecutive time domain resource locations.

At present, the P-UE can determine a minimum value of the number Y of candidate resource sub-frames according to network configuration, and determine by itself locations of the Y candidate sub-frames of a reservation resource set in a resource selection window. The P-UE performs channel monitoring at the moment $k \times P_{step}$ (time domain resource location) before the reservation resource set, excludes unavailable resources according to the monitored resource occupancy information of other terminal devices, and finally selects available candidate sub-frames from the Y candidate sub-frames for the P-UE to transmit its own information. Here, $P_{step}$ is a set fixed value.

In the process of transforming from the LTE V2X technology to the new radio access technology (NR) V2X technology, resource pools in the NR V2X technology can support wider resource transmission periods, for example, can support a variety of transmission and resource reservation that have short periods less than 100 ms. However, $P_{step}$ is a set fixed value, when the P-UE uses the fixed value as a parameter for partial sensing, the P-UE may not be able to sense the resource reservation having a short period, resulting in a high probability of resource collision.

SUMMARY

Embodiments of the present disclosure provide a resource selection method and a terminal device, which can improve the effect of partial sensing by the terminal device and reduce the probability of resource collision.

In some embodiments of the present disclosure provide a resource selection method, which is applied to a terminal device. The method includes: obtaining resource occupancy information of other terminal devices according to at least one sensing step length, where the at least one sensing step length is determined according to resource transmission periods supported by a resource pool, and the resource occupancy information indicates resources that have been occupied and/or reserved by the other terminal devices in candidate resources selected by the terminal device from the resource pool; and selecting target resources from the candidate resources other than the resources that have been occupied and/or reserved based on the resource occupancy information.

In one embodiment, the sensing step length(s) is/are determined by: determining the sensing step length(s) according to a least common multiple of the respective resource transmission periods supported by the resource pool; or, determining the sensing step length(s) according to a greatest common divisor of the respective resource transmission periods supported by the resource pool; or, taking sensing parameters determined according to the respective resource transmission periods supported by the resource pool as the sensing step lengths.

In one embodiment, the taking the sensing parameters determined according to the respective resource transmission periods supported by the resource pool as the sensing step lengths, includes: in a case that the respective resource transmission periods supported by the resource pool do not satisfy a multiplicative relationship, determining a corresponding sensing parameter according to each of the resource transmission periods respectively, to obtain the sensing parameters; and taking the obtained sensing parameters as the sensing step lengths.

In one embodiment, the sensing step length(s) is/are determined by: dividing the respective resource transmission periods supported by the resource pool into period sets, determining set sensing parameters corresponding to the respective period sets, and determining the sensing step length(s) according to the determined set sensing parameters.

In one embodiment, the determining the set sensing parameters corresponding to the respective period sets, includes: for each of the period sets, determining the set sensing parameter corresponding to the each period set by any one of the following schemes: determining the set sensing parameter corresponding to the each period set according to a least common multiple of respective resource transmission periods in the each period set; or, determining the set sensing parameter corresponding to the each period set according to a greatest common divisor of respective resource transmission periods in the each period set.

In one embodiment, the determining the set sensing parameters corresponding to the respective period sets, includes: for a part of the period sets, determining the set sensing parameter corresponding to each of the part of the period sets according to a least common multiple of respective resource transmission periods in the each of the part of the period sets; and for another part of period sets, determining the set sensing parameter corresponding to the each of the another part of the period sets according to a greatest common divisor of respective resource transmission periods in the each of the another part of the period sets.

In one embodiment, the determining the sensing step length(s) according to the determined set sensing parameters, includes: in a case that the determined set sensing parameters are the same, taking the same set sensing parameter as the sensing step length.

In one embodiment, for the period set including multiple resource transmission periods, every two resource transmission periods in the period set satisfy a multiplicative relationship, and the determining the sensing step length(s) according to the determined set sensing parameters, includes: taking all of the determined set sensing parameters as the sensing step lengths.

In one embodiment, the at least one sensing step length is determined by the terminal device; or, the at least one sensing step length is determined by a network side device and notified to the terminal device through RRC signaling.

In one embodiment, the obtaining resource occupancy information of other terminal devices according to at least one sensing step length, includes: determining sensing time domain resource locations in a resource sensing window according to time domain resource locations corresponding to the candidate resources selected by the terminal device and the at least one sensing step length; and obtaining the resource occupancy information of the other terminal devices for the candidate resources by performing channel monitoring at each of sensing time domain resource locations.

In some embodiments of the present disclosure provide a terminal device, including: an information obtaining device, configured to acquire obtain occupancy information of other terminal devices according to at least one sensing step length, where the at least one sensing step length is determined according to resource transmission periods supported by a resource pool, and the resource occupancy information indicates resources that have been occupied and/or reserved by the other terminal device in candidate resources selected by the terminal device from the resource pool; and a resource selection device, configured to select target resources from the candidate resources other than the resources that have been occupied and/or reserved based on the resource occupancy information.

In one embodiment, the terminal device further includes: a sensing step length determination device, configured to determine the sensing step length(s) according to a least common multiple of the respective resource transmission periods supported by the resource pool; or, determine the sensing step length(s) according to a greatest common divisor of the respective resource transmission periods supported by the resource pool; or, take sensing parameters determined according to the respective resource transmission periods supported by the resource pool as the sensing step lengths.

In one embodiment, the sensing step length determination device is configured to: in a case that the respective resource transmission periods supported by the resource pool do not satisfy a multiplicative relationship, determine a corresponding sensing parameter according to each of the resource transmission periods respectively, to obtain the sensing parameters; and take the obtained sensing parameters as the sensing step lengths.

In one embodiment, the sensing step length determination device is configured to: divide the respective resource transmission periods supported by the resource pool into period sets, determine set sensing parameters corresponding to the respective period sets, and determine the sensing step length(s) according to the determined set sensing parameters.

In one embodiment, the sensing step length determination device is configured to: for each of the period sets, determine the set sensing parameter corresponding to the each period set by any one of the following schemes: determining the set sensing parameter corresponding to the each period set according to a least common multiple of respective resource transmission periods in the each period set; or, determining the set sensing parameter corresponding to the each period set according to a greatest common divisor of respective resource transmission periods in the each period set.

In one embodiment, the sensing step length determination device is configured to: for a part of the period sets, determine the set sensing parameter corresponding to each of the part of the period sets according to a least common multiple of respective resource transmission periods in the each of the part of the period sets; and for another part of the period sets, determine the set sensing parameter corresponding to the each of the another part of the period sets according to a greatest common divisor of respective resource transmission periods in the each of the another part of the period sets.

In one embodiment, the sensing step length determination device is configured to: in a case that the determined set sensing parameters are the same, take the same set sensing parameter as the sensing step length.

In one embodiment, for the period set including multiple resource transmission periods, every two resource transmission periods in the period set satisfy a multiplicative relationship, and the sensing step length determination device is configured to: take all of the determined set sensing parameters as the sensing step lengths.

In one embodiment, the at least one sensing step length is determined by the terminal device; or, the at least one sensing step length is determined by a network side device and notified to the terminal device through RRC signaling.

In one embodiment, the information obtaining device is configured to: determine sensing time domain resource locations in a resource sensing window according to time domain resource locations corresponding to the candidate resources selected by the terminal device and the at least one sensing step length; and obtain the resource occupancy information of the other terminal devices for the candidate resources by performing channel monitoring at each of sensing time domain resource locations.

In some embodiments of the present disclosure provide a terminal device, including: a memory, configured to store computer instructions; a transceiver, configured to send and receive data under the control of a processor; and the processor, configured to read computer programs in the memory to execute the following operations: obtaining resource occupancy information of other terminal devices according to at least one sensing step length, where the at least one sensing step length is determined according to resource transmission periods supported by a resource pool, and the resource occupancy information indicates resources that have been occupied and/or reserved by the other terminal devices in candidate resources selected by the terminal device from the resource pool; and selecting target resources from the candidate resources other than the resources that have been occupied and/or reserved based on the resource occupancy information.

In one embodiment, the processor is further configured to: determine the sensing step length(s) according to a least common multiple of the respective resource transmission periods supported by the resource pool; or, determine the sensing step length(s) according to a greatest common divisor of the respective resource transmission periods supported by the resource pool; or, take sensing parameters ported by the resource pool; or, take sensing parameters determined according to the respective resource transmission periods supported by the resource pool as the sensing step lengths.

In one embodiment, the processor is configured to: in a case that the respective resource transmission periods supported by the resource pool do not satisfy a multiplicative relationship, determine a corresponding sensing parameter according to each of the resource transmission periods respectively, to obtain the sensing parameters; and take the obtained sensing parameters as the sensing step lengths.

In one embodiment, the processor further configured to: divide the respective resource transmission periods supported by the resource pool into period sets, determine set sensing parameters corresponding to the respective period sets, and determine the sensing step length(s) according to the determined set sensing parameters.

In one embodiment, the processor is configured to: for each of period sets, determine the set sensing parameter corresponding to the each period set by any one of the following schemes: determining the set sensing parameter corresponding to the each period set according to a least common multiple of respective resource transmission periods in the each period set; or, determining the set sensing parameter corresponding to the each period set according to a greatest common divisor of respective resource transmission periods in the each period set.

In one embodiment, the processor is configured to: for a part of period sets, determining the set sensing parameter corresponding to each of the part of the period sets according to a least common multiple of respective resource transmission periods in the each of the part of the period sets; and for another part of period sets, determining the set sensing parameter corresponding to each of the another part of the period sets according to a greatest common divisor of respective resource transmission periods in the each of the another part of the period sets.

In one embodiment, the processor is configured to: in a case that the determined set sensing parameters are the same, take the same set sensing parameter as the sensing step length.

In one embodiment, for the period set including multiple resource transmission periods, every two resource transmission periods in the period set satisfy a multiplicative relationship, and the processor is configured to: take all of the determined set sensing parameters as the sensing step lengths.

In one embodiment, the at least one sensing step length is determined by the terminal device; or, the at least one sensing step length is determined by a network side device and notified to the terminal device through RRC signaling.

In one embodiment, the processor is configured to: determine a plurality of sensing time domain resource locations in a resource sensing window according to time domain resource locations corresponding to the candidate resources selected by the terminal device and the at least one sensing step length; and obtain the resource occupancy information of the other terminal devices for the candidate resources by performing channel monitoring at each of sensing time domain resource locations.

In some embodiments of the present disclosure provide a computer readable storage medium storing computer instructions. The computer instructions are executed by a processor to perform any resource selection method in the embodiments.

In the resource selection method and terminal device provided by the embodiments of the present disclosure, resource occupancy information of other terminal devices is obtained according to at least one sensing step length, and target resources are selected from candidate resources based on the obtained resource occupancy information. At least one sensing step length is determined according to resource transmission periods supported by a resource pool, and the terminal device performs partial sensing according to the sensing step length(s) determined according to the resource transmission periods supported by the resource pool, which can reduce the number of resource reservation situations that cannot be sensed, improve the effect of partial sensing by the terminal device, reduce the probability of resource collision, and improve the reliability of information transmission of the terminal device.

DETAILED DESCRIPTION

The embodiments of the present disclosure will be described in detail below with reference to the accompanying drawings. It should be understood that the embodiments described herein are only used to illustrate and explain the present disclosure, but not to limit the present disclosure.

It should be noted that "first" and "second" in the embodiments of the present disclosure are used to distinguish similar objects, but not to describe a order or sequence. In the embodiments of the present disclosure, "and/or" describes the association relationship of associated objects, indicating that there may be three kinds of relationships, for example, A and/or B, which may indicate that A exists alone, A and B exist at the same time, and B exists alone. The character "/" generally indicates that the associated objects before and after the character are an "or" relationship.

The network architecture and service scenarios described in the embodiments of the present disclosure are for illustrating the embodiments of the present disclosure more clearly, and do not constitute a limitation on the embodiments of the present disclosure. The evolution of the network architecture and the emergence of new service scenarios, the embodiments of the present disclosure are also applicable to solve similar problems.

Figure 1:
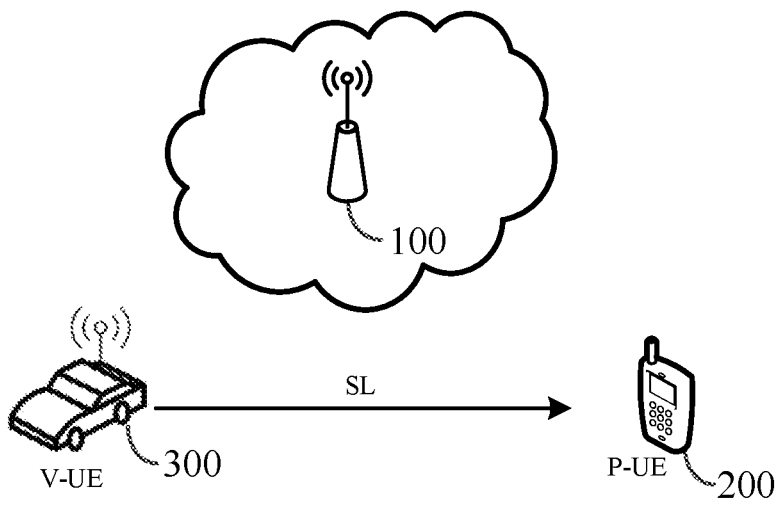
FIG. 1 is a schematic structural diagram of a communication system applicable in an embodiment of the present disclosure.

FIG. 1 is a schematic structural diagram of a communication network applicable in embodiments of the present disclosure. The communication network may be a V2X network, or a part of the V2X network. The V2X network includes communication manners such as vehicle to vehicle (V2V), vehicle to pedestrian (V2P), vehicle to infrastructure (V2I), and vehicle to network (V2N), etc. One end of the V2P communication may be a P-UE, and the other end may be vehicle-user equipment (V-UE), such as P-UE200 and V-UE300 shown in FIG. 1. The communication network may further include a network side device 100. Both the P-UE200 and the V-UE300 can be connected to the network side device 100 through a wireless network.

The network side device 100 is a device that provides wireless communication functions for terminal devices, and includes but not limited to the following in 5G: a $5^{th}$ generation Node B (gNB), radio network controller (RNC), node B (NB), base station controller (BSC), base transceiver station (BTS), home base station (for example, home evolved Node B (HeNB), or home Node B (HNB)), baseband unit (BBU), transmitting and receiving point (TRP), transmitting point (TP), mobile switching center, etc. The network side device 100 may also be a device that provides wireless communication functions for terminal devices in other communication systems that may appear in the future.

P-UE may be a device with wireless communication functions, and may be a mobile phone, a pad, a computer with wireless transceiver functions, a virtual reality (VR) terminal, an augmented reality (AR) terminal, a wireless terminal in industrial control, etc. The V-UE300 may be an in-vehicle terminal or the like in self-driving. Both P-UE200 and V-UE300 may provide voice and/or data connectivity for the users, have wireless connectivity functions, and may be connected to wireless modems, etc. The P-UE 200 and the V-UE 300 may communicate with one or more core networks via the network side device 100.

The P-UE200 and V-UE300 are capable of sidelink (SL) awareness. Since the P-UE200 does not need to receive data from the V-UE300, the P-UE200 only sends data, that is, only sends data and does not receive data. Under this premise, considering the power consumption problem caused by the P-UE200 continuously monitoring the channel, the P-UE200 may use a partial sensing method to perform channel monitoring. When performing partial sensing, the P-UE200 only receives sidelink control information (SCI) from other user equipment (UE), such as V-UE300, at some discontinuous time domain resource locations, to obtain the resource occupation/reservation of the other UE without needing to decode any corresponding data information.

Figure 2:
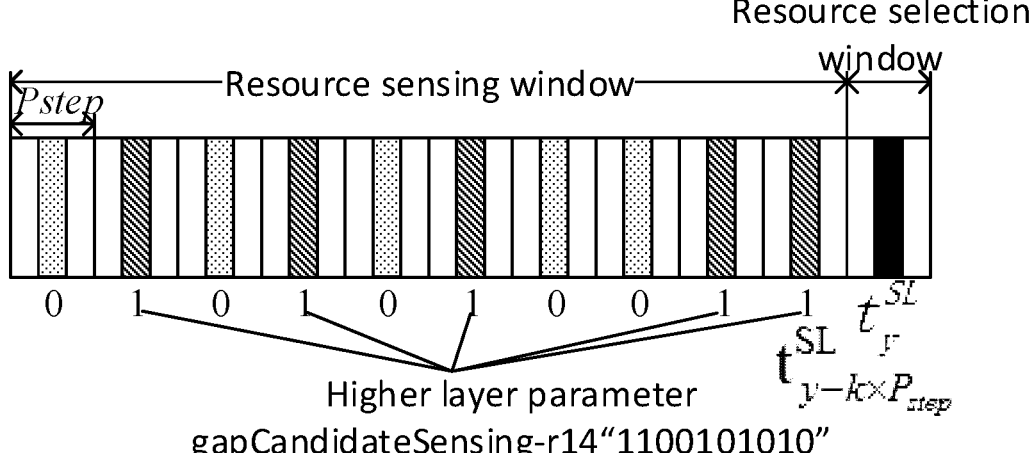
FIG. 2 is a schematic diagram of time domain resource locations of partial sensing in the related art.

At present, after the P-UE200 senses reservation resources of other UE through partial sensing in a resource sensing window and excludes collided resources, the process of determining available candidate resources in a resource selection window is shown in FIG. 2. According to the configuration of a higher layer parameter (minNumCAndidateSF-r14), the P-UE200 determines the minimum value of the number Y of resource candidate sub-frames, determines by itself locations of the Y candidate sub-frames of a reservation resource set in the resource selection window, and excludes unavailable resources from the Y candidate sub-frames $$t_y^{SL}$$

by monitoring resource occupancy information of other UE on the sub-frame $$t_{y-k \times P_{step}}^{SL}.$$

Here, $P_{step}$ is a set fixed value, such as 100 ms. The set of k values is configured by a higher layer parameter (gapCandidateSensing-r14), which is a sequence consisting of 0 and 1 with a length of 10 bits. For example, the higher layer parameter (gapCandidateSensing-r14) is "1100101010", and k corresponds to a location where the $k^{th}$ bit of the higher layer parameter (gapCandidateSensing-r14) is 1. The terminal senses at the moment $k \times P_{step}$ before a reservation resource set, excludes unavailable resources, and finally selects available candidate sub-frames from the Y candidate sub-frames for the terminal to transmit its own information.

In the process of transforming from the LTE V2X technology to the NR V2X technology, a resource pool in the NR V2X technology can support wider resource transmission periods, for example, can support a variety of transmission and resource reservation that have short periods less than 100 ms, and support resource transmission periods including [1, . . . , 99 ms] and [100, 200, . . . , 1000 ms]. However, since $P_{step}$ is a set fixed value, when the P-UE uses the fixed value as a parameter for partial sensing, the P-UE may not be able to sense the resource reservation having a short period, resulting in a high probability of resource collision. For example, assuming that $P_{step}$ is 100 ms, and resource transmission periods that the resource pool can support are 13 ms and 26 ms, if the P-UE still performs partial sensing at $k \times 100$ ms, the resource reservation of other LUE may not be sensed. If $P_{step}$ is directly set to a smaller value, the power consumption of the P-UE will be additionally increased. For example, assuming that $P_{step}$ is set to 1 ms, and resource transmission periods that the resource pool can support are 100 ms and 200 ms, if the P-LUE still performs partial sensing at $k \times 1$ ms, unnecessary power consumption will be increased. Therefore, it is necessary to provide a compromise solution that can reduce unnecessary power consumption and reduce the probability of resource collision.

In view of this, embodiments of the present disclosure provide a resource selection method. The resource selection method is applied to a terminal device. The terminal device may be the P-UE200 or the V-UE300 shown in FIG. 1. For example, when the remaining power is low, the V-UE 300 can also obtain resource occupancy information of other terminal devices by means of partial sensing. The terminal device may also be other communication terminals with power saving requirements or performing partial sensing.

In the resource selection method provided by the embodiments of the present disclosure, resource occupancy information of other terminal devices is obtained according to at least one sensing step length, and target resources are selected from candidate resources based on the obtained resource occupancy information. Here, the at least one sensing step length is determined according to resource transmission periods supported by a resource pool. The terminal device performs partial sensing according to the sensing step length determined according to the resource transmission periods supported by the resource pool, which can reduce unnecessary power consumption as much as possible, further reduce the number of resource reservation situations that cannot be sensed, improve the effect of partial sensing by the terminal device, reduce the probability of resource collision, and improve the reliability of information transmission of the terminal device.

Figure 3:
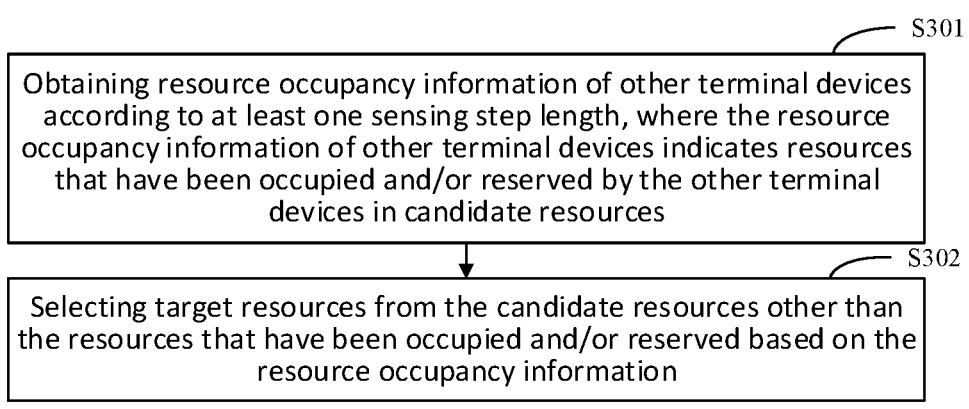
FIG. 3 is a schematic flowchart of a resource selection method according to an embodiment of the present disclosure.

FIG. 3 shows a schematic flowchart of a resource selection method provided by an embodiment of the present disclosure. The method is executed by a terminal device. The following description is given by taking P-UE executing the resource selection method as an example. As shown in FIG. 3, the method includes the following steps.

S301: obtaining resource occupancy information of other terminal devices according to at least one sensing step length.

Here, the at least one sensing step length is determined by the P-UE according to resource transmission periods supported by a resource pool, or is determined by a network side device according to resource transmission periods supported by a resource pool. If the sensing step length is determined by the network side device, the network side device may notify the P-UE of one or more determined sensing step lengths through radio resource control (RRC) signaling, and the P-UE obtains resource occupancy information of other terminal devices according to the one or more sensing step lengths.

The P-UE can determine sensing time domain resource locations in a resource sensing window according to time domain resource locations corresponding to candidate resources selected by the P-UE from the resource pool and the at least one sensing step length, and perform channel monitoring at each of sensing time domain resource locations to obtain resource occupancy information of the other terminal devices with respect to the candidate resources selected by the P-UE.

The resource occupancy information of other terminal devices is configured to indicate resources that have been occupied and/or reserved by the other terminal devices in the candidate resources.

Specifically, during partial sensing in the NR V2X, $P_{step}$ may be replaced with $P_{reserve}$ in embodiments of the present disclosure, and the range of $P_{reserve}$ also has a new definition. The complete set of candidates for $P_{reserve}$ is all the resource transmission periods configured and supported in the resource pool. One resource pool supports at most 16 different resource transmission periods, and values of these periods are selected and determined from $[1, \ldots, 99 \text{ ms}]$ and $[100, 200, \ldots, 1000 \text{ ms}]$. $P_{reserve}$ is determined based on all the resource transmission periods supported by the resource pool.

Figure 4:
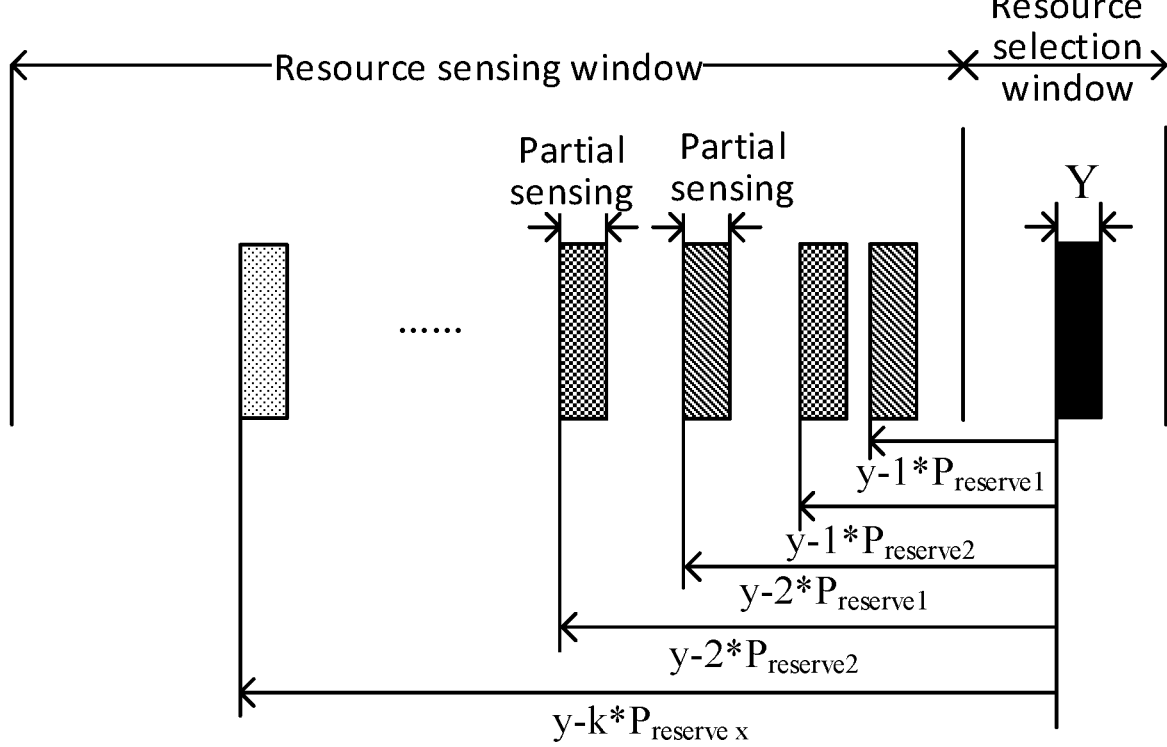
FIG. 4 is a schematic diagram of time domain resource locations of partial sensing according to an embodiment of the present disclosure.

Exemplarily, in the NR V2X, values of $P_{reserve}$ may be used for partial sensing. The P-UE first determines locations and sizes of Y candidate resource sub-frames in the resource selection window, and then determines time domain resource locations that need sensing in the resource sensing window according to the determined values of $P_{reserve}$ and different values of k. As shown in FIG. 4, at least two sensing step lengths are included, namely $P_{reserve1}$ and $P_{reserve2}$, respectively, and the P-UE performs channel monitoring at the time domain resource locations of $y-k*P_{reserve1}$ and $y-k*P_{reserve2}$, where y represents the initial location of Y candidate resource sub-frames, and the values of k are positive integers, such as $1, 2, 3, \ldots$, etc. Through channel monitoring, the P-UE can know the resources that have been occupied and/or reserved by other terminal devices in the candidate resources selected by the P-UE.

S302, selecting target resources from the candidate resources other than the resources that have been occupied and/or reserved based on the obtained resource occupancy information.

Based on the resource occupancy information obtained in S301, the P-UE may exclude resources that have been occupied and/or reserved by other terminal devices, and select target resources from resources that are still available, to transmit information based on the target resources and avoid the collision between its own transmission resources and the transmission resources of other terminal devices.

Whether the terminal device determines the sensing step length or the network side device determines the sensing step length, the value of the sensing step length can be determined with reference to the schemes described below.

In some embodiments, the number of sensing step lengths may be one, and the sensing step length may be determined according to any one of the following schemes.

Scheme 1: determining the sensing step length according to a least common multiple of the respective resource transmission periods supported by the resource pool.

Exemplarily, the least common multiple of the respective resource transmission periods supported by the resource pool may be used as the sensing step length; or, the integer multiple of the least common multiple of the respective resource transmission periods supported by the resource pool may be used as the sensing step length.

For example, when the least common multiple of the respective resource transmission periods supported by the resource pool is also one of the respective resource transmission periods supported by the resource pool, the least common multiple of the respective resource transmission periods supported by the resource pool may be used as the sensing step length. Assuming that the periods supported by the resource pool are 4 ms and 8 ms, the least common multiple 8 of 4 and 8 is one of the periods. In this case, the least common multiple of the respective resource transmission periods supported by the resource pool can be used as the sensing step length.

Scheme 2: determining the sensing step length according to a greatest common divisor of the respective resource transmission periods supported by the resource pool.

Scheme 3: dividing the respective resource transmission periods supported by the resource pool into period sets, and determining set sensing parameters corresponding to each of period sets. Specifically, for a part of period sets, determining the set sensing parameter corresponding to each period set according to a least common multiple of respective resource transmission periods in the each period set; and for another part of period sets, determining the set sensing parameter corresponding to each period set according to a greatest common divisor of respective resource transmission periods in the each period set. If the obtained set sensing parameters are the same, the set sensing parameter is taken as the sensing step length.

In some embodiments, for a period set including multiple resource transmission periods, every two resource transmission periods in the period set satisfy a multiplicative relationship.

Assuming that the sensing step length is determined according to N resource transmission periods supported by the resource pool, the N resource transmission periods may include a transmission period T1 of resources reserved by the terminal device itself, or may not include a transmission period T1 of resources reserved by the terminal device itself.

In other embodiments, the number of sensing step lengths may be multiple, and the sensing step lengths may be determined according to any one of the following schemes.

Scheme 1: taking sensing parameters determined according to the respective resource transmission periods supported by the resource pool as the sensing step length. Exemplarily, integer multiples of respective resource transmission periods may be used as sensing parameters determined according to the resource transmission periods, and integer multiples of the respective resource transmission periods supported by the resource pool may be used as the sensing step lengths; or the respective resource transmission periods supported by the resource pool are directly used as the sensing step lengths. That is, the sensing step lengths $P_{reserve}$ are a complete set of N periods supported by the resource pool, i.e., $P_{reserve}$ contains all the N periods.

For example, if resource transmission periods supported by the resource pool do not satisfy the multiplicative relationship, the corresponding sensing parameters are determined according to the respective resource transmission periods to obtain multiple sensing parameters, and the obtained multiple sensing parameters are used as the sensing step lengths. It is assumed that a resource pool supports the periods 3 ms and 7 ms, and the least common multiple is 21, however the resource pool does not support the period 21 ms. In such a case, both 3 ms and 7 ms can be used as the sensing step lengths, that is, $P_{reserve1}$ is 3 ms, and $P_{reserve2}$ is 7 ms.

Scheme 2: dividing the respective resource transmission periods supported by the resource pool into period sets, determining set sensing parameters corresponding to each of period sets, and determining the sensing step length according to the determined set sensing parameters. For example, N periods supported by the resource pool are divided into m subsets, each subset determines its own $P_{reserve}$, independently, and $P_{reserve}$ includes all the $P_{reserve}$.

In some embodiments, one period set may include one resource transmission period, or may include multiple resource transmission periods. For a period set including multiple resource transmission periods, every two resource transmission periods in the period set satisfy a multiplicative relationship.

In an embodiment, the set sensing parameter corresponding to the period set may be determined according to the least common multiple of respective resource transmission periods in the period set; or, the set sensing parameter corresponding to the period set may be determined according to the greatest common divisor of respective resource transmission periods in the period set. The obtained set sensing parameters are taken as the sensing step lengths.

In another embodiment, for a part of period sets, the set sensing parameter corresponding to each period set may be determined according to the least common multiple of the respective resource transmission periods in the each period set; and for another part of the period sets, the set sensing parameter corresponding to each period set may be determined according to the greatest common divisor of respective resource transmission periods in the each period set. The obtained set sensing parameters are taken as the sensing step lengths.

In the resource selection method provided by the embodiments of the present disclosure, resource occupancy information of other terminal devices is obtained according to one or more sensing step lengths, and target resources are selected from candidate resources based on the obtained resource occupancy information. Here, the sensing step length is determined according to resource transmission periods supported by a resource pool, which is the greatest common divisor or the least common multiple of the resource transmission periods supported by the resource pool. The terminal device performs partial sensing according to the sensing step length(s) determined according to the resource transmission periods supported by the resource pool, which can reduce unnecessary power consumption as much as possible, reduce the number of resource reservation situations that cannot be sensed, improve the effect of partial sensing performed by the terminal device, reduce the probability of resource collision, and improve the reliability of information transmission of the terminal device.

To facilitate the understanding, the following describes a method for determining the sensing step length(s) through several embodiments.

Embodiment 1

There is a multiplicative relationship among the respective resource transmission periods supported by a resource pool. The sensing step length is determined according to the least common multiple of the respective resource transmission periods supported by the resource pool and the number of the obtained sensing step lengths is one.

Specifically, it is assumed that the current resource pool supports 4 resource transmission periods (the values of the 4 periods are selected and determined from [1, . . . , 99 ms] and [100, 200, . . . , 1000 ms]), and these 4 resource transmission periods are respectively 20 ms, 50 ms, 100 ms and 200 ms. The resource transmission period reserved by the terminal itself is T1=400 ms, and T1=400 ms can also belong to the resource transmission periods supported by the current resource pool.

In an embodiment, the resource transmission period T1 reserved by the terminal may not be considered: the sensing step length of partial sensing is the least common multiple of 20 ms, 50 ms, 100 ms, and 200 ms, i.e., 200 ms. In another embodiment, considering the resource transmission period T1 reserved by the terminal: the sensing step length of partial sensing is the least common multiple of 20 ms, 50 ms, 100 ms, 200 ms and 400 ms, i.e., 400 ms.

For example, assuming that a V-UE in other terminal devices is using a resource transmission period of 50 ms, and the terminal device P-UE performs partial sensing with a sensing step length of 200 ms, when the V-UE transmits information, every 4 resources transmission periods will be monitored by the P-UE once, so the resources being used by the V-UE will also be sensed by the P-UE.

In the above embodiment, the current resource pool supporting 4 resource transmission periods is only an example, and in practical applications, the number of different resource transmission periods that a resource pool can support may be more than 4 or less than 4, for example, it can reach 16.

Embodiment 2

There is no multiplicative relationship among the respective resource transmission periods supported by the resource pool, and the sensing step length is determined according to the respective resource transmission periods supported by the resource pool.

Specifically, it is assumed that the current resource pool supports 4 resource transmission periods (the values of the 4 periods are selected and determined from [1, . . . , 99 ms] and [100, 200, . . . , 1000 ms]), and these 4 resource transmission periods are respectively 3 ms, 7 ms, 11 ms and 100 ms. The resource transmission period reserved by the terminal itself is T1=13 ms, and T1=13 ms can also belong to the resource transmission periods supported by the current resource pool.

In an embodiment, the resource transmission period T1 reserved by the terminal may not be considered: the period values of the four resource transmission periods of 3 ms, 7 ms, 11 ms, and 100 ms are used as the sensing step lengths for partial sensing, and partial sensing is performed respectively using the sensing step lengths. In this embodiment, the number of the obtained sensing step lengths is four.

In another embodiment, the resource transmission period T1 reserved by the terminal may not be considered: the sensing step length of partial sensing is the least common multiple (3*7*11*100) ms of the period values of the four resource transmission periods of 3 ms, 7 ms, 11 ms, and 100 ms. In this embodiment, the obtained number of the sensing step lengths is one.

In another embodiment, considering the resource transmission period T1 reserved by the terminal: the period values of five resource transmission periods of 3 ms, 7 ms, 11 ms, 100 ms and 13 ms are respectively used as the sensing step lengths of partial sensing, and partial sensing is performed respectively using these sensing step lengths. In this embodiment, the number of the obtained sensing step lengths is five.

In another embodiment, considering the resource transmission period T1 reserved by the terminal: the sensing step length of partial sensing is the least common multiple (3*7*11*100*13) ms of the period values of the five resource transmission periods of 3 ms, 7 ms, 11 ms, 100 ms and 13 ms. In this embodiment, the obtained number of the sensing step lengths is one.

In the above embodiments, the current resource pool supporting 4 resource transmission periods is only an example, and in practical applications, the number of different resource transmission periods that a resource pool supports can reach 16.

Embodiment 3

There is a multiplicative relationship among the respective resource transmission periods supported by the resource pool. The sensing step length is determined according to the greatest common divisor of the respective resource transmission periods supported by the resource pool, and the number of the obtained sensing step lengths is one.

Specifically, it is assumed that the current resource pool supports 4 resource transmission periods (the 4 period values are selected and determined from [1, . . . , 99 ms] and [100, 200, . . . , 1000 ms]), and these 4 resource transmission periods are respectively 20 ms, 40 ms, 80 ms, 100 ms. The resource transmission period reserved by the terminal itself is T1=10 ms, and T1=10 ms can also belong to the resource transmission periods supported by the current resource pool.

In an embodiment, the resource transmission period T1 reserved by the terminal may not be considered: the sensing step length of partial sensing is the greatest common divisor of 20 ms, 40 ms, 80 ms, and 100 ms, i.e., 20 ms. In another embodiment, considering the resource transmission period T1 reserved by the terminal: the sensing step length of partial sensing is the greatest common divisor of 20 ms, 40 ms, 80 ms, 100 ms and 10 ms, i.e., 10 ms.

In the above embodiments, the current resource pool supporting 4 resource transmission periods is only an example, and in practical applications, the number of different resource transmission periods that a resource pool supports can reach 16.

Embodiment 4

There is no multiplicative relationship among the respective resource transmission periods supported by the resource pool, and the sensing step length is determined according to the respective resource transmission periods supported by the resource pool.

Specifically, it is assumed that the current resource pool supports 4 resource transmission periods (the 4 period values are selected and determined from [1, . . . , 99 ms] and [100, 200, . . . , 1000 ms]), and these 4 resource transmission periods are respectively 3 ms, 7 ms, 11 ms, 100 ms. The resource transmission period reserved by the terminal itself is T1=13 ms, and T1=13 ms can also belong to the resource transmission periods supported by the current resource pool.

In an embodiment, the resource transmission period T1 reserved by the terminal may not be considered: the sensing step length of partial sensing is the greatest common divisor of the period values of the four resource transmission periods of 3 ms, 7 ms, 11 ms, and 100 ms, i.e., 1 ms. In this embodiment, the number of the obtained sensing step lengths is one.

In another embodiment, the resource transmission period T1 reserved by the terminal may not be considered: the period values of the four resource transmission periods of 3 ms, 7 ms, 11 ms, and 100 ms are used as the sensing step lengths of partial sensing, and partial sensing is performed respectively using these sensing step lengths. In this embodiment, the number of the obtained sensing step lengths is four.

In another embodiment, considering the resource transmission period T1 reserved by the terminal: the sensing step length of partial sensing is the greatest common divisor of the period values of five resource transmission periods of 3 ms, 7 ms, 11 ms, 100 ms and 13 ms, i.e., 1 ms. In this embodiment, the number of the obtained sensing step lengths is one.

In another embodiment, considering the resource transmission period T1 reserved by the terminal: the period values of five resource transmission periods of 3 ms, 7 ms, 11 ms, 100 ms and 13 ms are respectively used as the sensing step lengths of partial sensing, and partial sensing is performed respectively using these sensing step lengths. In this embodiment, the number of the obtained sensing step lengths is five.

In the above embodiments, the current resource pool supporting 4 resource transmission periods is only an example, and in practical applications, the number of different resource transmission periods that a resource pool supports can reach 16.

Embodiment 5

There is a multiplicative relationship among the respective resource transmission periods supported by the resource pool, or there is a multiplicative relationship among a part of resource transmission periods supported by the resource pool. The sensing step length is determined according to a compromise value of the least common multiple and the greatest common divisor of the respective resource transmission periods supported by the resource pool, and the number of the obtained sensing step length is 1.

Specifically, it is assumed that the current resource pool supports 4 resource transmission periods (the 4 period values are selected and determined from [1, . . . , 99 ms] and [100, 200, . . . , 1000 ms]), and these 4 resource transmission periods are respectively 20 ms, 50 ms, 100 ms, 200 ms. The resource transmission period reserved by the terminal itself is T1=400 ms, and T1=400 ms can also belong to the resource transmission periods supported by the current resource pool.

In an embodiment, the resource transmission period T1 reserved by the terminal may not be considered: the sensing step length of partial sensing is 100 ms, which is the least common multiple of 20 ms and 50 ms, and is also the greatest common divisor of 100 ms and 200 ms.

In this embodiment, 20 ms and 50 ms may be divided into a first period set, and 100 ms and 200 ms may be divided into a second period set. A set sensing parameter corresponding to the first period set is determined to be 100 ms according to the least common multiple of respective resource transmission periods, i.e., 20 ms and 50 ms, in the first period set. A set sensing parameter corresponding to the second period set is determined to be 100 ms according to the greatest common divisor of respective resource transmission periods, i.e., 100 ms and 200 ms, in the second period set. The set sensing parameter corresponding to the first period set and the set sensing parameter corresponding to the second period set are both 100 ms, therefore, 100 ms is taken as the sensing step length for partial sensing.

It should be noted that the sensing step length of partial sensing is: a compromise value of the least common multiple and the greatest common divisor of the respective resource transmission periods supported by the resource pool. The compromise value M may be a period value in the respective resource transmission periods supported by the resource pool, or may not be a period value in the respective resource transmission periods supported by the resource pool, but M is the least common multiple of periods t1 and t2, and M is also the greatest common divisor of periods t3 and t4.

In another embodiment, considering the resource transmission period T1 reserved by the terminal: the sensing step length of partial sensing is 100 ms, which is the least common multiple of 20 ms and 50 ms, and is also the greatest common divisor of 100 ms, 200 ms and 400 ms.

In this embodiment, 20 ms and 50 ms may be divided into a first period set, and 100 ms, 200 ms and 400 ms may be divided into a second period set. A set sensing parameter corresponding to the first period set is determined to be 100 ms according to the least common multiple of respective resource transmission periods, i.e., 20 ms and 50 ms, in the first period set.

A set sensing parameter corresponding to the second period set is determined to be 100 ms according to the greatest common divisor of respective resource transmission periods, i.e., 100 ms, 200 ms and 400 ms, in the second period set. The set sensing parameter corresponding to the first period set and the set sensing parameter corresponding to the second period set are both 100 ms, therefore 100 ms is taken as the sensing step length for partial sensing.

In the above embodiments, the current resource pool supporting 4 resource transmission periods is only an example, and in practical applications, the number of different resource transmission periods that a resource pool supports can reach 16.

Embodiment 6

There is a multiplicative relationship among a part of resource transmission periods supported by the resource pool, and the sensing step length is determined according to the least common multiple and the greatest common divisor of the respective resource transmission periods supported by the resource pool.

Specifically, it is assumed that the current resource pool supports 4 resource transmission periods (the 4 period values are selected and determined from [1, . . . , 99 ms] and [100, 200, . . . , 1000 ms]), and these 4 resource transmission periods are respectively 13 ms, 26 ms, 100 ms and 200 ms. The resource transmission period reserved by the terminal itself is T1=400 ms, and T1=400 ms can also belong to the resource transmission periods supported by the current resource pool.

In an embodiment, the resource transmission period T1 reserved by the terminal may not be considered: the sensing step lengths for partial sensing are 26 ms and 100 ms respectively, that is, the least common multiple of 13 ms and 26 ms is selected as one of the sensing step lengths, and the greatest common divisor of 100 ms and 200 ms is selected as the other sensing step length. In this embodiment, the number of the obtained sensing step lengths is two.

In this embodiment, 13 ms and 26 ms may be divided into a first period set, and 100 ms and 200 ms may be divided into a second period set. A set sensing parameter corresponding to the first period set is determined to be 26 ms according to the least common multiple of the respective resource transmission periods, i.e., 13 ms and 26 ms, in the first period set. A set sensing parameter corresponding to the second period set is determined to be 100 ms according to the greatest common divisor of the respective resource transmission periods, i.e., 100 ms and 200 ms, in the second period set. The set sensing parameter 26 ms corresponding to the first period set and the set sensing parameter 100 ms corresponding to the second period set are both taken as the sensing step lengths for partial sensing.

In another embodiment, the resource transmission period T1 reserved by the terminal may not be considered: the sensing step lengths for partial sensing are 26 ms and 200 ms respectively, that is, the least common multiple of 13 ms and 26 ms is selected as one of the sensing step lengths, and the least common multiple of 100 ms and 200 ms is selected as another sensing step length. In this embodiment, the number of the obtained sensing step lengths is two.

In this embodiment, 13 ms and 26 ms may be divided into a first period set, and 100 ms and 200 ms may be divided into a second period set. A set sensing parameter corresponding to the first period set is determined to be 26 ms according to the least common multiple of the respective resource transmission periods, i.e., 13 ms and 26 ms, in the first period set. A set sensing parameter corresponding to the second period set is determined to be 200 ms according to the least common multiple of the respective resource transmission periods, i.e., 100 ms and 200 ms, in the second period set. The set sensing parameter 26 ms corresponding to the first period set and the set sensing parameter 200 ms corresponding to the second period set are both taken as the sensing step lengths for partial sensing.

In another embodiment, the resource transmission period T1 reserved by the terminal may not be considered: the sensing step lengths for partial sensing are 13 ms and 100 ms respectively, that is, the greatest common divisor of 13 ms and 26 ms is selected as one of the sensing step lengths, and the greatest common divisor of 100 ms and 200 ms is selected as another sensing step length. In this embodiment, the number of the obtained sensing step lengths is two.

In this embodiment, 13 ms and 26 ms may be divided into a first period set, and 100 ms and 200 ms may be divided into a second period set. A set sensing parameter corresponding to the first period set is determined to be 13 ms according to the greatest common divisor of the respective resource transmission periods, i.e., 13 ms and 26 ms, in the first period set. A set sensing parameter corresponding to the second period set is determined to be 100 ms according to the greatest common divisor of the respective resource transmission periods, i.e., 100 ms and 200 ms, in the second period set. The set sensing parameter 13 ms corresponding to the first period set and the set sensing parameter 100 ms corresponding to the second period set are both taken as the sensing step lengths for partial sensing.

In another embodiment, considering the resource transmission period T1 reserved by the terminal: the sensing step lengths of partial sensing are 26 ms and 100 ms respectively, that is, the least common multiple of 13 ms and 26 ms is selected as one of the sensing step lengths, and the greatest common divisor of 100 ms, 200 ms and 400 ms is selected as another sensing step length. In this embodiment, the number of the obtained sensing step lengths is two.

In this embodiment, 13 ms and 26 ms may be divided into a first period set, and 100 ms, 200 ms and 400 ms may be divided into the second period set. A set sensing parameter corresponding to the first period set is determined to be 26 ms according to the least common multiple of the respective resource transmission periods, i.e., 13 ms and 26 ms, in the first period set. A set sensing parameter corresponding to the second period set is determined to be 100 ms according to the greatest common divisor of the respective resource transmission periods, i.e., 100 ms, 200 ms and 400 ms, in the second period set. The set sensing parameter 26 ms corresponding to the first period set and the set sensing parameter 100 corresponding to the second period set are both taken as the sensing step lengths for partial sensing.

In another embodiment, considering the resource transmission period T1 reserved by the terminal: the sensing step lengths of partial sensing are 26 ms and 400 ms respectively, that is, the least common multiple of 13 ms and 26 ms is selected as one of the sensing step lengths, and the least common multiple of 100 ms, 200 ms and 400 ms is selected as another sensing step length. In this embodiment, the number of the obtained sensing step lengths is two.

In this embodiment, 13 ms and 26 ms may be divided into a first period set, and 100 ms, 200 ms and 400 ms may be divided into a second period set. A set sensing parameter corresponding to the first period set is determined to be 26 ms according to the least common multiple of the respective resource transmission periods, i.e., 13 ms and 26 ms, in the first period set. A set sensing parameter corresponding to the second period set is determined to be 400 ms according to the least common multiple of the respective resource transmission periods, i.e., 100 ms, 200 ms and 400 ms, in the second period set. The set sensing parameter 26 ms corresponding to the first period set and the set sensing parameter 400 ms corresponding to the second period set are both taken as the sensing step lengths for partial sensing.

In another embodiment, considering the resource transmission period T1 reserved by the terminal: the sensing step lengths of partial sensing are 13 ms and 100 ms respectively, that is, the greatest common divisor of 13 ms and 26 ms is selected as one of the sensing step lengths, and the greatest common divisor of 100 ms, 200 ms and 400 ms is selected as another sensing step length. In this embodiment, the number of the obtained sensing step lengths is two.

In this embodiment, 13 ms and 26 ms may be divided into a first period set, and 100 ms, 200 ms and 400 ms may be divided into a second period set. A set sensing parameter corresponding to the first period set is determined to be 13 ms according to the greatest common divisor of the respective resource transmission periods, i.e., 13 ms and 26 ms, in the first period set. A set sensing parameter corresponding to the second period set is determined to be 100 ms according to the greatest common divisor of the respective resource transmission periods, i.e., 100 ms, 200 ms and 400 ms, in the second period set. The set sensing parameter 13 ms corresponding to the first period set and the set sensing parameter 100 ms corresponding to the second period set are both taken as the sensing step lengths for partial sensing.

It should be noted that if some of the multiple resource transmission periods supported in the resource pool have a multiplicative relationship with each other, and some do not have a multiplicative relationship, the periods with multiplicative relationships may be divided into a period set. Each period set finds its own greatest common divisor or least common multiple, which is used as the set sensing parameter of the each period set.

In the above embodiments, the current resource pool supporting 4 resource transmission periods is only an example, and in practical applications, the number of different resource transmission periods that a resource pool supports can reach 16.

Embodiment 7

There is a multiplicative relationship among a part of resource transmission periods supported by the resource pool, and there is no multiplicative relationship among another part of the resource transmission periods. The sensing step length is determined according to the respective resource transmission periods supported by the resource pool.

Specifically, it is assumed that the current resource pool supports 4 resource transmission periods (the 4 period values are selected and determined from [1, . . . , 99 ms] and [100, 200, . . . , 1000 ms]), and these 4 resource transmission periods are respectively 3 ms, 7 ms, 50 ms and 100 ms. The resource transmission period reserved by the terminal itself is T1=200 ms, and T1=200 ms can also belong to the resource transmission periods supported by the current resource pool.

In an embodiment, the resource transmission period T1 reserved by the terminal may not be considered: the sensing step lengths of partial sensing are 3 ms, 7 ms and 100 ms, respectively. That is, 3 ms and 7 ms are selected as the sensing step lengths, and the least common multiple of 50 ms and 100 ms is selected as another sensing step length. In this embodiment, the number of the obtained sensing step lengths is three.

In this embodiment, 3 ms may be divided into a first period set, 7 ms may be divided into a second period set, and 50 ms and 100 ms may be divided into a third period set. Since the first period set only includes one resource transmission period 3 ms, therefore the set sensing parameter corresponding to the first period set is determined to be 3 ms. Since the second period set only includes one resource transmission period 7 ms, the set sensing parameter corresponding to the second period set is determined to be 7 ms. A set sensing parameter corresponding to the third period set is determined to be 100 ms according to the least common multiple of the respective resource transmission periods, i.e., 50 ms and 100 ms, in the third period set. The set sensing parameter 3 ms corresponding to the first period set, the set sensing parameter 7 ms corresponding to the second period set and the set sensing parameter 100 ms corresponding to the third period set are all taken as the sensing step lengths for partial sensing.

In another embodiment, the resource transmission period T1 reserved by the terminal may not be considered: the sensing step lengths of partial sensing are 3 ms, 7 ms and 50 ms, respectively. That is, 3 ms and 7 ms are selected as the sensing step lengths, and the greatest common divisor of 50 ms and 100 ms is selected as another sensing step length. In this embodiment, the number of the obtained sensing step lengths is three.

In this embodiment, 3 ms may be divided into a first period set, 7 ms may be divided into a second period set, and 50 ms and 100 ms may be divided into a third period set. Since the first period set only includes one resource transmission period 3 ms, the set sensing parameter corresponding to the first period set is determined to be 3 ms. Since the second period set only includes one resource transmission period 7 ms, the set sensing parameter corresponding to the second period set is determined to be 7 ms. A set sensing parameter corresponding to the third period set is determined to be 50 ms according to the greatest common divisor of the respective resource transmission periods, i.e., 50 ms and 100 ms, in the third period set. The set sensing parameter 3 ms corresponding to the first period set, The set sensing parameter 7 ms corresponding to the second period set and the set sensing parameter 50 ms corresponding to the third period set are all taken as the sensing step lengths for partial sensing.

In another embodiment, considering the resource transmission period T1 reserved by the terminal: the sensing step lengths of partial sensing are 3 ms, 7 ms and 200 ms, respectively. That is, 3 ms and 7 ms are selected as the sensing step lengths, and the least common multiple of 50 ms, 100 ms and 200 ms is selected as another sensing step length. In this embodiment, the number of the obtained sensing step lengths is three.

In this embodiment, 3 ms may be divided into a first period set, 7 ms may be divided into a second period set, and 50 ms, 100 ms and 200 ms may be divided into a third period set. Since the first period set only includes one resource transmission period 3 ms, the set sensing parameter corresponding to the first period set is determined to be 3 ms. Since the second period set only includes one resource transmission period 7 ms, the set sensing parameter corresponding to the second period set is determined to be 7 ms. A set sensing parameter corresponding to the third period set is determined to be 200 ms according to the least common multiple of the respective resource transmission periods, i.e., 50 ms, 100 ms and 200 ms, in the third period se. The set sensing parameter 3 ms corresponding to the first period set, the set sensing parameter 7 ms corresponding to the second period set and the set sensing parameter 200 ms corresponding to the third period set are all taken as the sensing step lengths for partial sensing.

In another embodiment, considering the resource transmission period T1 reserved by the terminal: the sensing step lengths of partial sensing are 3 ms, 7 ms and 50 ms, respectively. That is, 3 ms and 7 ms are respectively selected as the sensing step lengths, and the greatest common divisor of 50 ms, 100 ms and 200 ms is selected as another sensing step length. In this embodiment, the number of the obtained sensing step lengths is three.

In this embodiment, 3 ms may be divided into a first period set, 7 ms may be divided into a second period set, and 50 ms, 100 ms and 200 ms may be divided into a third period set. Since the first period set only includes one resource transmission period 3 ms, the set sensing parameter corresponding to the first period set is determined to be 3 ms. Since the second period set only includes one resource transmission period 7 ms, the set sensing parameter corresponding to the second period set is determined to be 7 ms. A set sensing parameter corresponding to the third period set is determined to be 50 ms according to the greatest common divisor of the respective resource transmission periods, i.e., 50 ms, 100 ms and 200 ms, in the third period set. The set sensing parameter 3 ms corresponding to the first period set, the set sensing parameter 7 ms corresponding to the second period set and the set sensing parameter 50 ms corresponding to the third period set are all taken as the sensing step lengths for partial sensing.

In the above embodiments, the current resource pool supporting 4 resource transmission periods is only an example, and in practical applications, the number of different resource transmission periods that a resource pool can support can reach 16.

Embodiments of the present disclosure provide a method of determining the sensing step length $P_{reserve}$. The sensing step length can be determined by obtaining the greatest common divisor and the least common multiple of the respective resource transmission periods, or finding multiple values that can satisfy the multiplicative relationships as $P_{reserve}$ according to the values of the respective resource transmission periods in a period list supported by the current resource pool. Then partial sensing can be performed according to the determined sensing step length.

Embodiments of the present disclosure further provide a terminal device, which can implement the processes performed by the foregoing embodiments.

Figure 5:
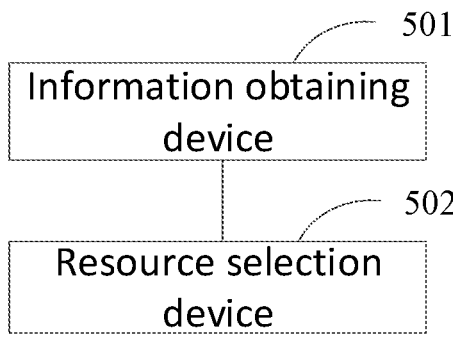
FIG. 5 is a structural block diagram of a terminal device according to an embodiment of the present disclosure.

FIG. 5 is a schematic structural diagram of a terminal device according to an embodiment of the present disclosure. As shown in FIG. 5, the terminal device includes: an information obtaining device 501 and a resource selection device 502.

The information obtaining device 501 is configured to obtain resource occupancy information of other terminal devices according to at least one sensing step length. The at least one sensing step length is determined according to resource transmission periods supported by a resource pool. The resource occupancy information indicates resources that have been occupied and/or reserved by the other terminal devices in the candidate resources selected by the terminal device from the resource pool.

The resource selection device 502 is configured to select target resources from the candidate resources other than the resources that have been occupied and/or reserved based on the resource occupancy information.

Figure 6:
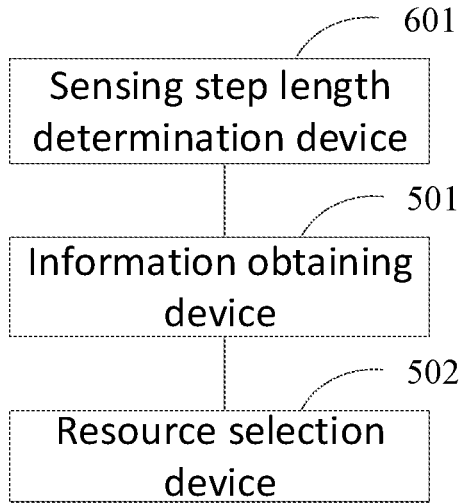
FIG. 6 is a structural block diagram of another terminal device provided by an embodiment of the present disclosure.

In one embodiment, as shown in FIG. 6, the terminal device provided by the embodiment of the present disclosure further includes a sensing step length determination device 601. The sensing step length determination device 601 is configured to determine the sensing step length according to a least common multiple of the respective resource transmission periods supported by the resource pool; or, determine the sensing step length according to a greatest common divisor of the respective resource transmission periods supported by the resource pool; or, take sensing parameters determined according to the respective resource transmission periods supported by the resource pool as the sensing step lengths.

In one embodiment, the sensing step length determination device 601 is configured to: in a case that the respective resource transmission periods supported by the resource pool do not satisfy a multiplicative relationship, determine a corresponding sensing parameter according to each resource transmission period respectively to obtain the sensing parameters; and take the obtained sensing parameters as the sensing step lengths.

In one embodiment, the sensing step length determination device 601 is further configured to: divide the respective resource transmission periods supported by the resource pool into period sets, determine set sensing parameters corresponding to period sets, and determine the sensing step length(s) according to the determined set sensing parameters.

In one embodiment, the sensing step length determination device 601 is configured to: for each of period sets, determine the set sensing parameter corresponding to the period set by any one of the following schemes: determining the set sensing parameter corresponding to the period set according to a least common multiple of respective resource transmission periods in the period set; or, determining the set sensing parameter corresponding to the period set according to a greatest common divisor of respective resource transmission periods in the period set.

In one embodiment, the sensing step length determination device 601 is configured to: for a part of period sets, determine the set sensing parameter corresponding to each period set according to a least common multiple of respective resource transmission periods in the each period set; and for another part of period sets, determine the set sensing parameter corresponding to the each period set according to a greatest common divisor of respective resource transmission periods in the each period set.

In one embodiment, the sensing step length determination device 601 is configured to: in a case that the determined set sensing parameters are the same, take the same set sensing parameter as the sensing step length.

In one embodiment, for the period set including multiple resource transmission periods, every two resource transmission periods in the period set satisfy a multiplicative relationship, and the sensing step length determination device 601 is configured to: take each of the determined set sensing parameters as the sensing step length.

In one embodiment, the at least one sensing step length is determined by the terminal device; or, the at least one sensing step length is determined by a network side device and notified to the terminal device through RRC signaling.

In one embodiment, the information obtaining device 501 is configured to: determine sensing time domain resource locations in a resource sensing window according to time domain resource locations corresponding to the candidate resources selected by the terminal device and the at least one sensing step length; and obtain the resource occupancy information of the other terminal devices for the candidate resources by performing channel monitoring at each of sensing time domain resource locations.

The terminal device provided by the embodiments of the present disclosure obtains resource occupancy information of other terminal devices according to at least one sensing step length, and selects target resources from candidate resources based on the obtained resource occupancy information. At least one sensing step length is determined according to the resource transmission periods supported by the resource pool. The terminal device performs partial sensing according to the sensing step length determined according to the resource transmission periods supported by the resource pool, which can reduce the number of resource reservation situations that cannot be sensed, improve the effect of partial sensing by the terminal device, reduce the probability of resource collision, and improve the reliability of information transmission of the terminal device.

Embodiments of the present disclosure further provide a terminal device. The terminal device can implement the flow of the method executed in FIG. 2 in the foregoing embodiments.

Figure 7:
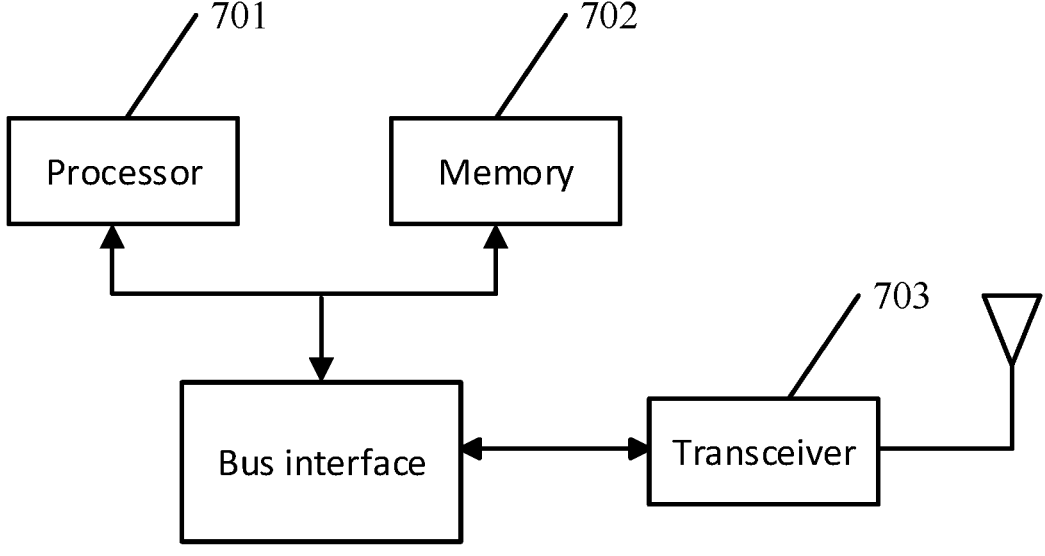
FIG. 7 is a schematic structural diagram of another terminal device according to an embodiment of the present disclosure.

FIG. 7 shows a schematic structural diagram of the terminal device provided by an embodiment of the present disclosure, that is, another schematic structural diagram of the terminal device. As shown in FIG. 7, the terminal device includes a processor 701, a memory 702 and a transceiver 703.

The processor 701 is responsible for managing the bus architecture and general processing. The memory 702 stores data used by the processor 701 in performing operations. The transceiver 703 is configured to receive and transmit data under the control of the processor 701.

The bus architecture may include any number of interconnected buses and bridges, in particular one or more processors represented by the processor 701 and various circuits of a memory represented by the memory 702 are linked together. The bus architecture may also link together various other circuits, such as peripherals, voltage regulators, and power management circuits, which are well known in the art, and therefore will not be described further herein. The bus interface provides interfaces. The processor 701 is responsible for managing the bus architecture and general processing, and the memory 702 may store data used by the processor 701 in performing operations.

The processes disclosed in the embodiments of the present disclosure may be applied to the processor 701 or implemented by the processor 701. In the implementation process, each step of the signal processing flow can be completed by an integrated logic circuit of hardware or software instructions in the processor 701. The processor 701 may be a general-purpose processor, a digital signal processor, an application-specific integrated circuit, a field programmable gate array or other programmable logic device, a discrete gate or transistor logic device, a discrete hardware component, and may implement or execute the disclosed methods, steps, and logical block diagrams in the embodiments of the present disclosure. The general-purpose processor may be a microprocessor or any conventional processor or the like. The steps of the method disclosed in the embodiments of the present disclosure may be directly embodied as executed by a hardware processor, or executed by a combination of hardware and software components in the processor. The software components may be located in a random memory, flash memory, read-only memory, programmable read-only memory or electrically erasable programmable memory, registers and other mature storage medium in the art. The storage medium is located in the memory 702, and the processor 701 reads the information in the memory 702, and completes the steps of the signal processing flow in combination with its hardware.

Specifically, the processor 701 is configured to read the programs in the memory 702 to perform: obtaining resource occupancy information of other terminal devices according to at least one sensing step length, where the at least one sensing step length is determined according to resource transmission periods supported by a resource pool, and the resource occupancy information indicates resources that have been occupied and/or reserved by the other terminal devices in candidate resources selected by the terminal device from the resource pool; and selecting target resources from the candidate resources other than the resources that have been occupied and/or reserved based on the resource occupancy information.

In one embodiment, the processor 701 is further configured to: determine the sensing step length according to a least common multiple of the respective resource transmission periods supported by the resource pool; or, determine the sensing step length according to a greatest common divisor of the respective resource transmission periods supported by the resource pool; or, take sensing parameters determined according to the respective resource transmission periods supported by the resource pool as the sensing step lengths.

In one embodiment, the processor 701 is configured to: in a case that the respective resource transmission periods supported by the resource pool do not satisfy a multiplicative relationship, determine a corresponding sensing parameter according to each resource transmission period respectively to obtain the sensing parameters; and take the obtained sensing parameters as the sensing step lengths.

In one embodiment, the processor 701 is further configured to: divide the respective resource transmission periods supported by the resource pool into period sets, determine set sensing parameters corresponding to period sets, and determine the sensing step length(s) according to the determined set sensing parameters.

In one embodiment, the processor 701 is configured to: for each of period sets, determine the set sensing parameter corresponding to the period set by any one of the following schemes: determining the set sensing parameter corresponding to the period set according to a least common multiple of respective resource transmission periods in the period set; or, determining the set sensing parameter corresponding to the period set according to a greatest common divisor of respective resource transmission periods in the period set.

In one embodiment, the processor 701 is configured to: for a part of period sets, determine the set sensing parameter corresponding to each period set according to a least common multiple of respective resource transmission periods in the each period set; and for another part of period sets, determine the set sensing parameter corresponding to each period set according to a greatest common divisor of respective resource transmission periods in the each period set.

In one embodiment, the processor 701 is configured to: in a case that the determined set sensing parameters are the same, take the same set sensing parameter as the sensing step length.

In one embodiment, for the period set including multiple resource transmission periods, every two resource transmission periods in the period set satisfy a multiplicative relationship, and the processor 701 is configured to: take each of the determined set sensing parameters as the sensing step length.

In one embodiment, the at least one sensing step length is determined by the terminal device; or, the at least one sensing step length is determined by a network side device and notified to the terminal device through RRC signaling.

In one embodiment, the processor 701 is configured to: determine sensing time domain resource locations in a resource sensing window according to time domain resource locations corresponding to the candidate resources selected by the terminal device and the at least one sensing step length; and obtain the resource occupancy information of the other terminal devices for the candidate resources by performing channel monitoring at each of sensing time domain resource locations.

The terminal device provided by the embodiments of the present disclosure obtains resource occupancy information of other terminal devices according to at least one sensing step length, and selects target resources from candidate resources based on the obtained resource occupancy information. At least one sensing step length is determined according to the resource transmission periods supported by the resource pool. The terminal device performs partial sensing according to the sensing step length(s) determined according to the resource transmission periods supported by the resource pool, which can reduce the number of resource reservation situations that cannot be sensed, improve the effect of partial sensing by the terminal device, reduce the probability of resource collision, and improve the reliability of information transmission of the terminal device.

Embodiments of the present disclosure further provide a computing device readable storage medium for the resource selection method, that is, the content in the computing device readable storage medium is not lost after the power is turned off. The storage medium stores software programs, including program codes. When the program codes are run on a computing device, the software programs can be read and executed by one or more processors to perform any of the above resource selection methods in the embodiments of the present disclosure.

Embodiments of the present disclosure are described above with reference to block diagrams and/or flowchart illustrations illustrating methods, devices (systems) and/or computer program products according to the embodiments of the present disclosure. It will be understood that a block of the block diagrams and/or flowchart illustrations, and combinations of blocks of the block diagrams and/or flowchart illustrations, can be implemented by computer program instructions. These computer program instructions may be provided to a general-purpose computer, a processor of a special purpose computer and/or other programmable data processing apparatus to produce a machine and the instructions executed via the computer processor and/or other programmable data processing apparatus create the methods of implementing the functions/actions specified in the block diagrams and/or flowchart blocks.

Accordingly, the embodiments of the present disclosure may also be implemented in hardware and/or software (including firmware, resident software, microcode, etc.). Further, the embodiments of the present disclosure may take the form of a computer program product on a computer-usable or computer-readable storage medium having computer-usable or computer-readable program codes embodied in the medium for execution by an instruction execution system or execution in conjunction with an instruction execution system. In the context of the embodiments of the present disclosure, a computer-usable or computer-readable medium may be any medium that may contain, store, communicate with, transmit, or send programs for use by, or in conjunction with, an instruction execution system, apparatus, or device.

What is claimed is:

1. A resource selection method, applied to a terminal device, and the method comprising:

obtaining resource occupancy information of other terminal devices according to at least one sensing step length, wherein the at least one sensing step length is determined according to resource transmission periods supported by a resource pool, and the resource occupancy information indicates first resources in candidate resources selected by the terminal device from the resource pool, wherein the first resources comprise one or a combination of: resources that have been occupied or resources reserved by the other terminal devices; and selecting target resources from the candidate resources other than the first resources based on the resource occupancy information;

wherein the sensing step length is determined by:

taking sensing parameters determined according to the respective resource transmission periods supported by the resource pool as the sensing step length.

2. The method according to claim 1, wherein said taking the sensing parameters determined according to the respective resource transmission periods supported by the resource pool as the sensing step length, comprises:

in a case that the respective resource transmission periods supported by the resource pool do not satisfy a multiplicative relationship, determining a corresponding sensing parameter according to each of the resource transmission periods respectively, to obtain the sensing parameters; and taking the sensing parameters as the sensing step length.

3. The method according to claim 1, wherein the sensing step length is determined by:

dividing the respective resource transmission periods supported by the resource pool into a plurality of period sets, determining set sensing parameters corresponding to the respective period sets, and determining the sensing step length according to the set sensing parameters.

4. The method according to claim 3, wherein said determining the set sensing parameters corresponding to the respective period sets, comprises:

for each of the period sets, determining the set sensing parameter corresponding to the each period set by:

determining the set sensing parameter corresponding to the each period set according to a least common multiple of respective resource transmission periods in the each period set; or, determining the set sensing parameter corresponding to the each period set according to a greatest common divisor of respective resource transmission periods in the each period set.

5. The method according to claim 3, wherein said determining the set sensing parameters corresponding to the respective period sets, comprises:

for a part of the period sets, determining the set sensing parameter corresponding to each of the part of the period sets according to a least common multiple of respective resource transmission periods in the each period set; and for another part of the period sets, determining the set sensing parameter corresponding to each of the another part of the period sets according to a greatest common divisor of respective resource transmission periods in the each period set.

6. The method according to claim 5, wherein said determining the sensing step length according to the set sensing parameters, comprises:

in a case that the set sensing parameters are a same set sensing parameter, taking the same set sensing parameter as the sensing step length.

7. The method according to claim 3, wherein for the period set including multiple resource transmission periods, every two resource transmission periods in the period set satisfy a multiplicative relationship, and said determining the sensing step length according to the set sensing parameters, comprises:

taking all of the set sensing parameters as the sensing step length.

8. The method according to claim 1, wherein the at least one sensing step length is determined by the terminal device; or, the at least one sensing step length is determined by a network side device and notified to the terminal device through radio resource control (RRC) signaling.

9. The method according to claim 1, wherein said obtaining the resource occupancy information of the other terminal devices according to the at least one sensing step length, comprises:

determining a plurality of sensing time domain resource locations in a resource sensing window according to time domain resource locations corresponding to the candidate resources selected by the terminal device and the at least one sensing step length; and obtaining the resource occupancy information of the other terminal devices for the candidate resources by performing channel monitoring at each of the plurality of sensing time domain resource locations.

10. A terminal device, comprising:

a memory, configured to store computer instructions;

a transceiver, configured to send and receive data under control of a processor; and the processor, configured to read computer programs in the memory to perform:

obtaining resource occupancy information of other terminal devices according to at least one sensing step length, wherein the at least one sensing step length is determined according to resource transmission periods supported by a resource pool, and the resource occupancy information indicates first resources in candidate resources selected by the terminal device from the resource pool, wherein the first resources comprises one or a combination of: resources that have been occupied or resources reserved by the other terminal devices; and selecting target resources from the candidate resources other than the first resources based on the resource occupancy information;

wherein the processor is further configured to:

take sensing parameters determined according to the respective resource transmission periods supported by the resource pool as the sensing step length.

11. The terminal device according to claim 10, wherein the processor is further configured to:

in a case that the respective resource transmission periods supported by the resource pool do not satisfy a multiplicative relationship, determine a corresponding sensing parameter according to each of the resource transmission periods respectively, to obtain the sensing parameters; and take the sensing parameters as the sensing step length.

12. The terminal device according to claim 10, wherein the processor is further configured to:

divide the respective resource transmission periods supported by the resource pool into a plurality of period sets, determine set sensing parameters corresponding to the respective period sets, and determine the sensing step length according to the set sensing parameters.

13. The terminal device according to claim 12, wherein the processor is further configured to:

for each of the period sets, determine the set sensing parameter corresponding to the each period set by:

determining the set sensing parameter corresponding to the each period set according to a least common multiple of respective resource transmission periods in the each period set; or, determining the set sensing parameter corresponding to the each period set according to a greatest common divisor of respective resource transmission periods in the each period set.

14. The terminal device according to claim 12, wherein the processor is further configured to:

for a part of the period sets, determine the set sensing parameter corresponding to each of the part of the period sets according to a least common multiple of respective resource transmission periods in the each period set; and for another part of the period sets, determine the set sensing parameter corresponding to each of the another part of the period sets according to a greatest common divisor of respective resource transmission periods in the each period set.

15. The terminal device according to claim 14, wherein the processor is further configured to:

in a case that the set sensing parameters are a same sensing parameter, take the set same sensing parameter as the sensing step length.

16. The terminal device according to claim 12, wherein for the period set including multiple resource transmission periods, every two resource transmission periods in the period set satisfy a multiplicative relationship, and the processor is further configured to determine the sensing step length according to the set sensing parameters by:

taking all of the set sensing parameters as the sensing step length.

17. The terminal device according to claim 10, wherein the processor is further configured to:

determine a plurality of sensing time domain resource locations in a resource sensing window according to time domain resource locations corresponding to the candidate resources selected by the terminal device and the at least one sensing step length; and obtain the resource occupancy information of the other terminal devices for the candidate resources by performing channel monitoring at each of the plurality of sensing time domain resource locations.

18. A non-transitory computer readable storage medium storing computer instructions, wherein the computer instructions are executed by a processor to perform the method according to claim 1.

\* \* \* \* \*